(12) United States Patent
Zhou et al.

(10) Patent No.: US 12,126,490 B2
(45) Date of Patent: Oct. 22, 2024

(54) PERIODIC BEAM FAILURE INDICATOR REPORTING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 17/369,818

(22) Filed: Jul. 7, 2021

(65) Prior Publication Data

US 2023/0011548 A1 Jan. 12, 2023

(51) Int. Cl.
*H04L 41/0677* (2022.01)
*H04B 7/06* (2006.01)
*H04L 5/00* (2006.01)
*H04W 24/10* (2009.01)

(52) U.S. Cl.
CPC ....... *H04L 41/0677* (2013.01); *H04B 7/0626* (2013.01); *H04L 5/0048* (2013.01); *H04W 24/10* (2013.01)

(58) Field of Classification Search
CPC . H04L 41/0677; H04L 5/0048; H04L 43/065; H04B 7/0626; H04B 7/0695; H04W 24/10
See application file for complete search history.

(56) References Cited

U.S. PATENT DOCUMENTS

| | | | | |
|---|---|---|---|---|
| 11,728,873 | B2* | 8/2023 | Zhou | H04B 7/0626 370/329 |
| 2019/0254042 | A1* | 8/2019 | Cirik | H04L 5/0048 |
| 2019/0281480 | A1* | 9/2019 | Wei | H04B 7/0617 |
| 2020/0107383 | A1* | 4/2020 | Novlan | H04W 76/15 |
| 2020/0137657 | A1* | 4/2020 | Chavva | H04W 36/008375 |
| 2020/0196327 | A1* | 6/2020 | Zhang | H04W 72/21 |
| 2021/0058805 | A1* | 2/2021 | Ji | H04W 24/04 |
| 2021/0105176 | A1* | 4/2021 | Tsai | H04L 41/0816 |
| 2021/0168631 | A1* | 6/2021 | Chen | H04W 76/19 |
| 2022/0322113 | A1* | 10/2022 | Zhang | H04W 76/18 |
| 2022/0353707 | A1* | 11/2022 | Cirik | H04L 5/0048 |
| 2022/0417772 | A1* | 12/2022 | Xia | H04W 24/04 |

* cited by examiner

*Primary Examiner* — Justin T Van Roie
(74) *Attorney, Agent, or Firm* — Arun Swain

(57) ABSTRACT

Various aspects of the present disclosure generally relate to wireless communication. In some aspects, a user equipment (UE) may receive, using a beam, a plurality of reference signals associated with a channel for wireless communication. The UE may report, based at least in part on a plurality of measurements associated with the beam, a plurality of beam failure indicators according to a periodic beam failure indicator reporting configuration. Numerous other aspects are described.

30 Claims, 8 Drawing Sheets

PERIODIC BEAM FAILURE INDICATOR REPORTING

FIELD OF THE DISCLOSURE

Aspects of the present disclosure generally relate to wireless communication and to techniques and apparatuses associated with periodic beam failure indicator reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory. The apparatus may include one or more processors, coupled to the memory, configured, receive, using a beam, a plurality of reference signals associated with a channel for wireless communication report, based at least in part on a plurality of measurements associated with the beam, a plurality of beam failure indicators according to a periodic beam failure indicator reporting configuration.

Some aspects described herein relate to an apparatus for wireless communication at a base station. The apparatus may include a memory. The apparatus may include one or more processors, coupled to the memory, configured, transmit a periodic beam failure indicator reporting configuration receive a plurality of beam failure indicators according to the periodic beam failure indicator reporting configuration.

Some aspects described herein relate to a method of wireless communication performed by a UE. The method may include receiving, using a beam, a plurality of reference signals associated with a channel for wireless communication. The method may include reporting, based at least in part on a plurality of measurements associated with the beam, a plurality of beam failure indicators according to a periodic beam failure indicator reporting configuration.

Some aspects described herein relate to a method of wireless communication performed by a base station. The method may include transmitting a periodic beam failure indicator reporting configuration. The method may include receiving a plurality of beam failure indicators according to the periodic beam failure indicator reporting configuration.

Some aspects described herein relate to a non-transitory computer-readable medium that stores a set of instructions for wireless communication by a UE. The set of instructions, when executed by one or more processors of the UE, may cause the UE to receive, using a beam, a plurality of reference signals associated with a channel for wireless communication. The set of instructions, when executed by one or more processors of the UE, may cause the UE to report, based at least in part on a plurality of measurements associated with the beam, a plurality of beam failure indicators according to a periodic beam failure indicator reporting configuration.

Some aspects described herein relate to a non-transitory computer-readable medium that stores a set of instructions for wireless communication by a base station. The set of instructions, when executed by one or more processors of the base station, may cause the base station to transmit a periodic beam failure indicator reporting configuration. The set of instructions, when executed by one or more processors of the base station, may cause the base station to receive a plurality of beam failure indicators according to the periodic beam failure indicator reporting configuration.

Some aspects described herein relate to an apparatus for wireless communication. The apparatus may include means for receiving, using a beam, a plurality of reference signals associated with a channel for wireless communication. The apparatus may include means for reporting, based at least in part on a plurality of measurements associated with the beam, a plurality of beam failure indicators according to a periodic beam failure indicator reporting configuration.

Some aspects described herein relate to an apparatus for wireless communication. The apparatus may include means for transmitting a periodic beam failure indicator reporting configuration. The apparatus may include means for receiving a plurality of beam failure indicators according to the periodic beam failure indicator reporting configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
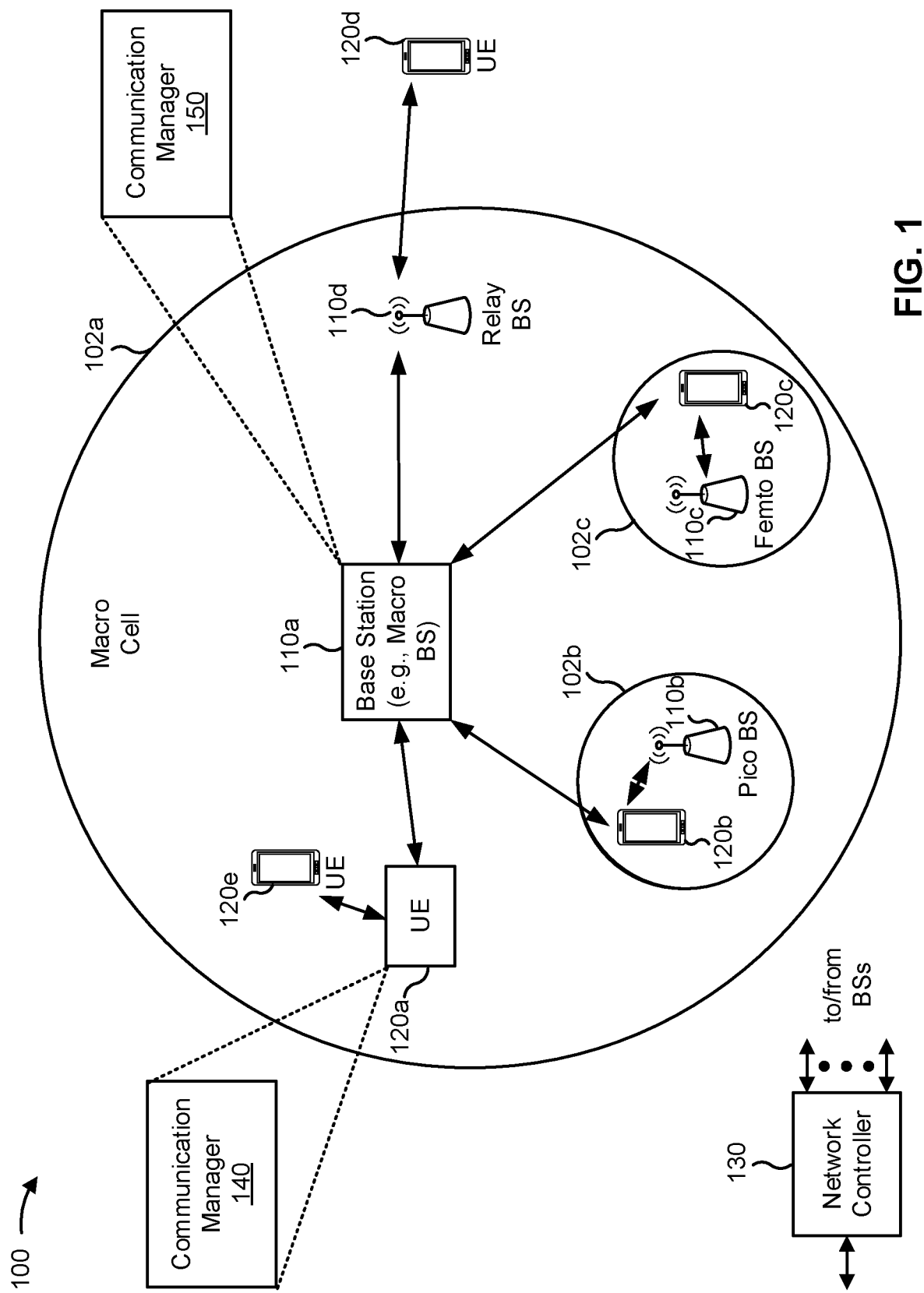
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, using a beam, a reference signal associated with a channel for wireless communication; and generate a non-binary beam failure indicator based at least in part on a measurement associated with the beam, wherein the non-binary beam failure indicator comprises at least one non-binary beam failure indicator value. Additionally, or alternatively, the communication manager 140 may perform one or more other operations described herein.

In some aspects, the base station 110 may include a communication manager 150. As described in more detail elsewhere herein, the communication manager 150 may transmit a non-binary beam failure indicator configuration that indicates a non-binary beam failure indicator, the non-binary beam failure indicator comprising at least one non-binary beam failure indicator value; and transmit a periodic beam failure determination reference signal associated with a channel for wireless communication. Additionally, or alternatively, the communication manager 150 may perform one or more other operations described herein.

As indicated above, FIG. 1 is provided as an example. Other examples may differ from what is described with regard to FIG. 1.

Figure 2:
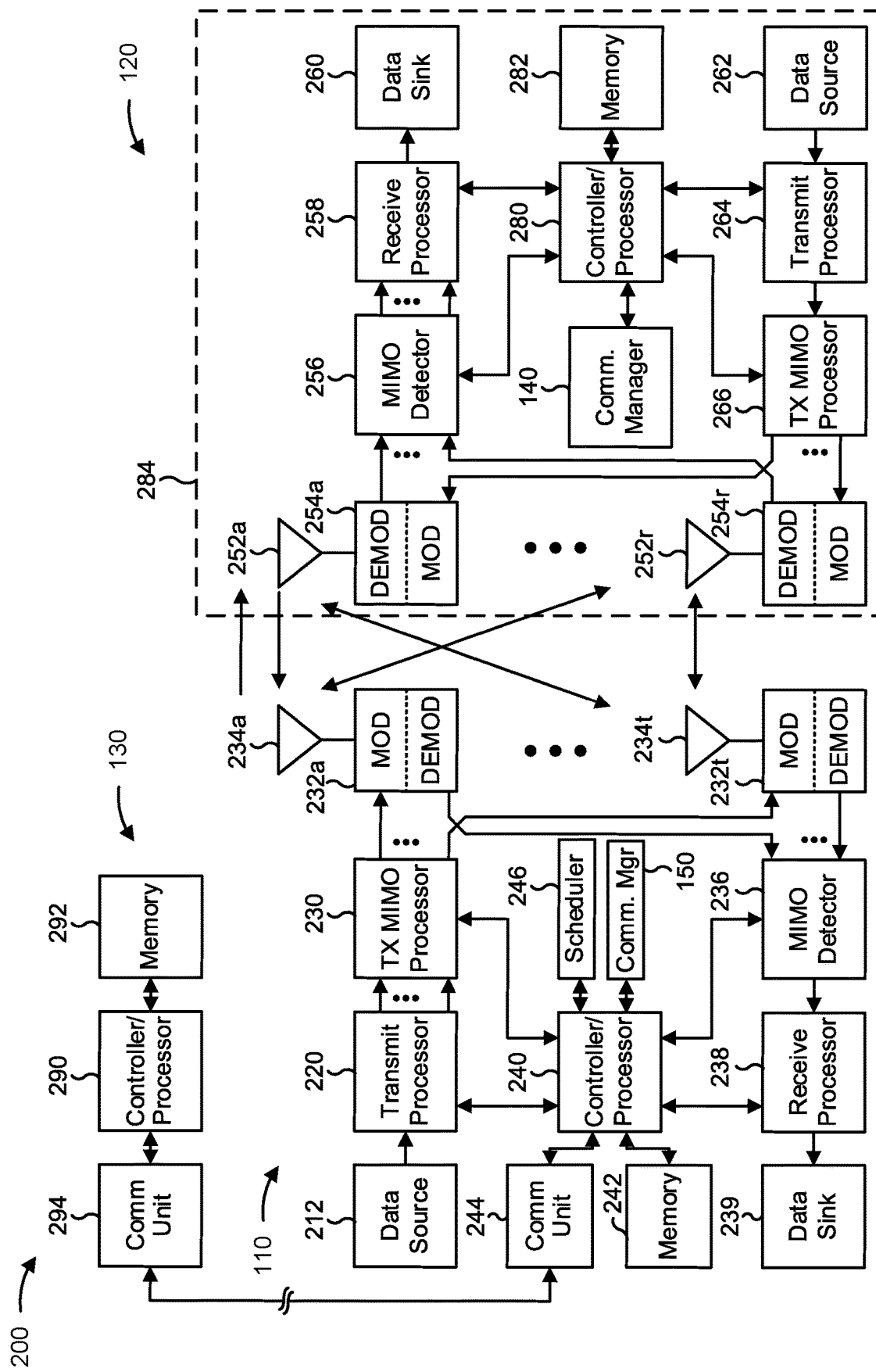
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, controller/processor 280 of the UE 120, and/or any other component(s) of FIG. 2 may perform one or more techniques associated with periodic beam failure indicator (BFI) reporting, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving, using a beam, a reference signal associated with a channel for wireless communication; and/or means for generating a non-binary beam failure indicator based at least in part on a measurement associated with the beam, wherein the non-binary beam failure indicator comprises at least one non-binary beam failure indicator value. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a non-binary beam failure indicator configuration that indicates a non-binary beam failure indicator, the non-binary beam failure indicator comprising at least one non-binary beam failure indicator value; and/or means for transmitting a periodic beam failure determination reference signal associated with a channel for wireless communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
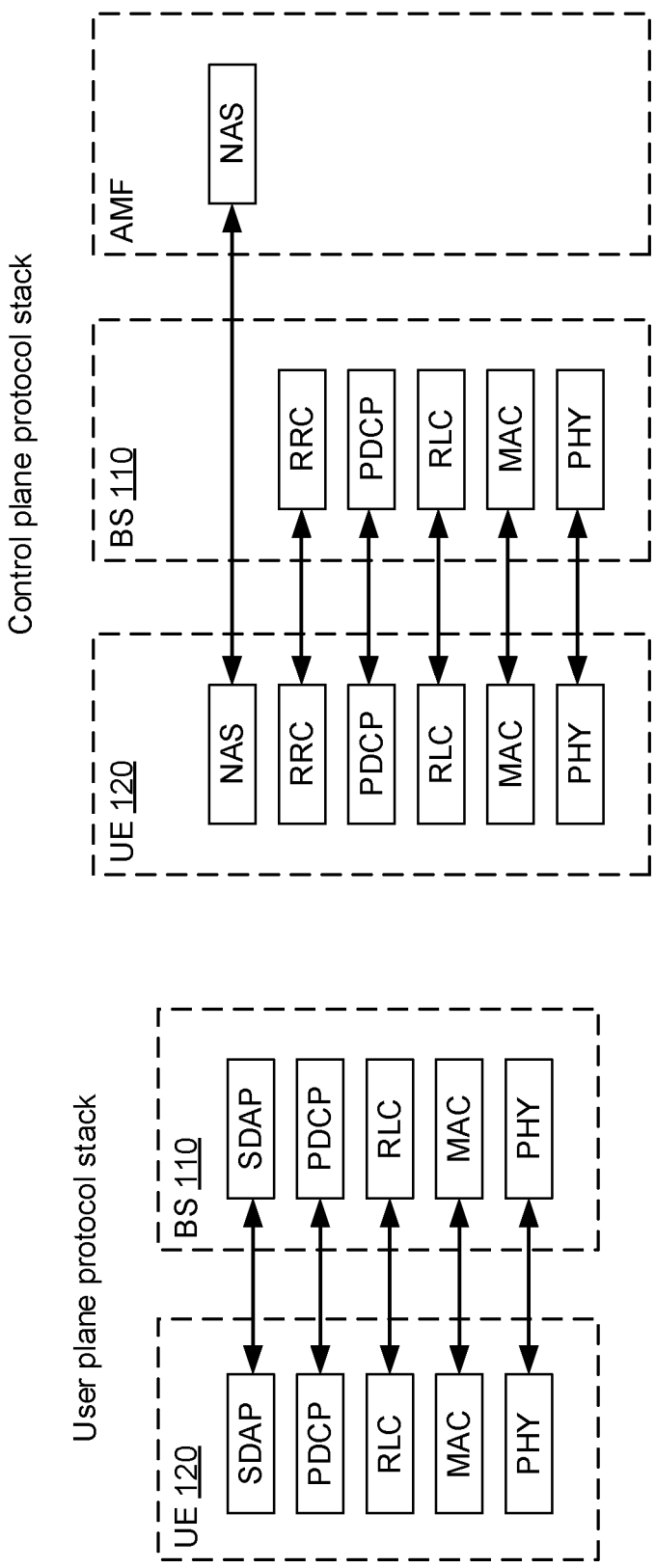
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers.

The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

In wireless communication, beams may be used between a transmitter of a wireless communication device and a receiver of another wireless communication device to facilitate signal transmission. However, due to the uncertain nature of the wireless environment and potential unexpected blocking, beams may be vulnerable to beam failure. Beam failure may be caused by poor channel quality and/or temporary interference from other beams and/or other radio frequency signals, among other examples.

In some cases, a UE may be configured to determine beam failure based on calculating a physical downlink control channel (PDCCH) signal to interference plus noise ratio (SINR). The physical layer of a UE may determine, from the PDCCH SINR, a block error rate (BLER) and compare the SINR and/or the BLER to a threshold. If the SINR and/or BLER satisfies the threshold, the physical layer may provide a BFI to the MAC layer of the UE. The MAC layer may determine that a beam failure has occurred when a count of BFIs satisfies a maximum count threshold. The UE may report beam failure to the base station only when the beam failure is determined by the MAC layer based on the BFI count. Thus, the base station, unaware of BFIs until the beam failure is reported until the UE reports the beam failure and/or initiates a random access channel (RACH) procedure for beam failure recovery, may waste time and resources recovering failed beams. Moreover, in some cases, communication of channel state feedback may be inefficient for indicating channel conditions to the base station. In this way, the UE and/or the base station may inefficiently consume processing resources and/or cause unnecessary signaling overhead due to an inability of the base station to anticipate beam failure and/or to ascertain channel conditions from the UE's perspective. This may have a negative impact on network performance.

Some aspects of the techniques and apparatuses described herein may provide periodic reporting of BFIs. For example, in some aspects, the base station may transmit, and the UE may receive, a periodic BFI reporting configuration. The UE may receive, using a beam, a reference signal and may report, based at least in part on a plurality of measurements associated with the beam, a plurality of beam failure indicators. In this way, some aspects may facilitate making the base station aware of an upcoming beam failure determination by the UE and may inform the base station regarding channel conditions, which may enable a UE to initiate beam failure recovery procedures only in appropriate circumstances (e.g., when beam failure is caused by poor signal quality) and/or enable the base station to adjust transmission parameters to avoid beam failure. Additionally, aspects of the cause-oriented BFI may provide a more precise description of channel condition and/or may facilitate power saving and/or delay reduction.

As a result, some aspects may reduce unnecessary processing and signaling overhead, which may have a positive impact on network performance.

As indicated above, FIG. 3 is provided as an example. Other examples may differ from what is described with regard to FIG. 3. In some aspects, BFIs may be determined by, and/or reported by, other protocol layers of the UE.

Figure 4:
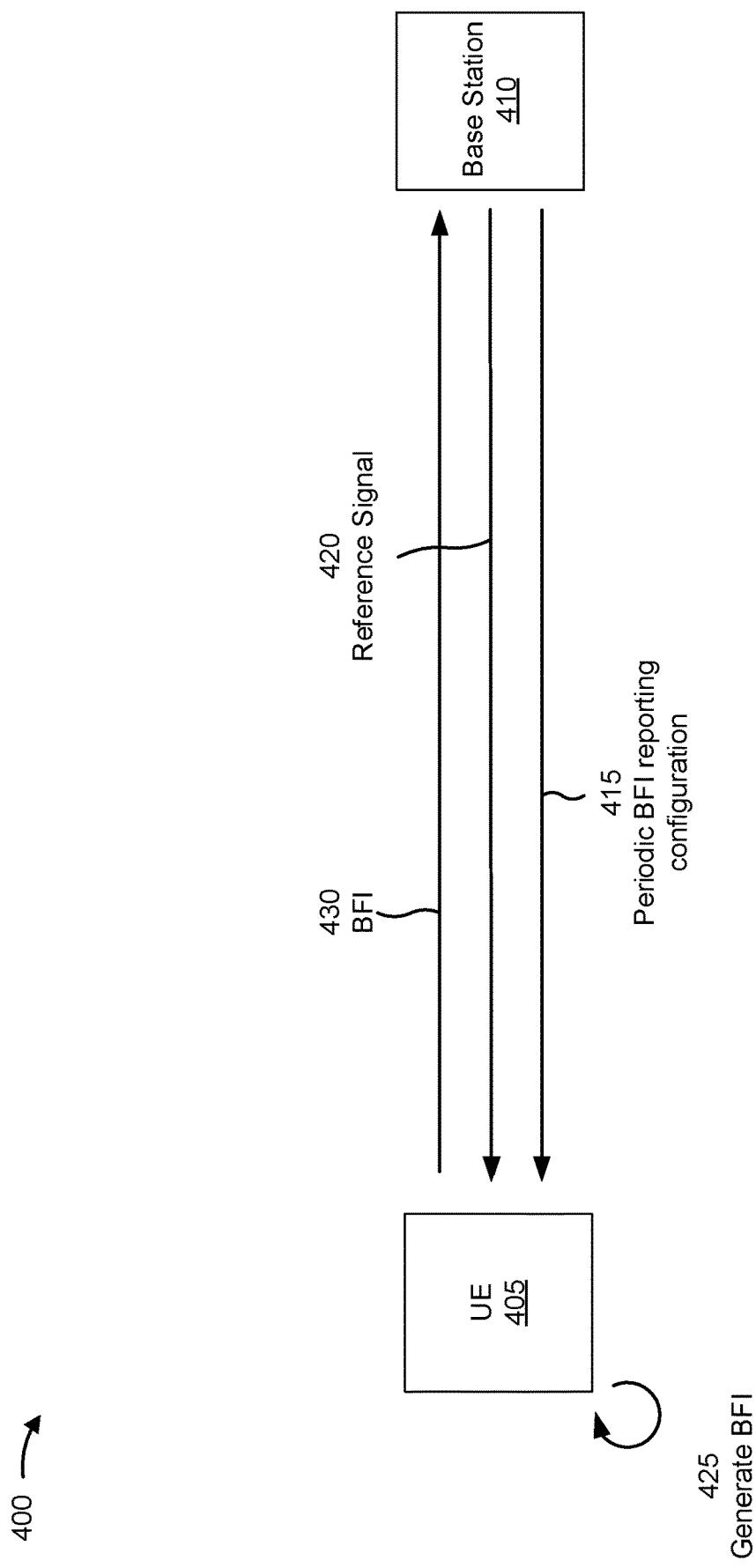
FIG. 4 is a diagram illustrating an example associated with periodic beam failure indicator reporting, in accordance with the present disclosure.

FIG. 4 is a diagram illustrating an example 400 of periodic beam failure indicator reporting, in accordance with the present disclosure. As shown in FIG. 4, a UE 405, and a base station 410 may communicate with one another.

As shown by reference number 415, the base station 410 may transmit, and the UE 405 may receive, a periodic BFI reporting configuration. For example, the base station 410 may transmit an RRC message that includes the periodic BFI reporting configuration. The periodic BFI reporting configuration may indicate one or more parameter values associated with periodic reporting of BFIs determined based on received reference signals.

In some aspects, the periodic beam failure indicator reporting configuration indicates one or more parameter values, the one or more parameter values comprising at least one of a reporting periodicity or a channel condition measurement time period. In some aspects, the periodic beam failure indicator reporting configuration may indicate at least one reporting frequency. In some aspects, the at least one reporting frequency may include a plurality of reporting frequencies, and the UE 405 may be configured to select an active frequency of the plurality of reporting frequencies. In some aspects, the base station may transmit, and the UE may receive, an indication of the active frequency.

In some aspects, the base station 410 may transmit, and the UE 405 may receive, a parameter switch indication to switch from a first value of the set of parameter values to a second value of the set of parameter values. For example, the base station 410 may transmit the parameter switch indication using a downlink control information (DCI) transmission and/or a MAC control element (MAC CE).

As shown by reference number 420, the base station 410 may transmit, and the UE 405 may receive, using a beam, a periodic reference signal. The reference signal may include a beam failure determination reference signal (BFD-RS) associated with a channel for wireless communication. In some aspects, the reference signal may include a dedicated BFD-RS, synchronization signal block (SSB), or channel state information-RS (CSI-RS).

As shown by reference number 425, the UE 405 may generate a BFI based at least in part on a measurement associated with the beam. As shown by reference number 430, the UE 405 may report the BFI to the base station 410 in accordance with the periodic BFI reporting configuration.

In some aspects, the UE 405 may generate a beam failure report based at least in part on determining a count of a plurality of beam failure indications. The beam failure report may indicate one or more channel measurements. In some aspects, the one or more channel measurements may correspond to channel state feedback.

In some aspects, the UE 405 may transmit a request to enter periodic BFI reporting status. For example, the UE 405 may transmit the request using a MAC CE and/or an uplink control information (UCI) transmission. In some aspects, the base station 410 may transmit, and the UE 405 may receive, an indication to enter periodic BFI reporting status. In some aspects, for example, the base station may transmit the indication using a MAC CE and/or a DCI transmission. In some aspects, the UE 405 may detect an occurrence of a periodic beam failure reporting trigger event. The UE 405 may report the plurality of BFIs based at least in part on detecting the occurrence of the periodic beam failure reporting trigger event.

As indicated above, FIG. 4 is provided as an example. Other examples may differ from what is described with respect to FIG. 4. For example, the UE 405 may be configured to periodically report BFI based at least upon detecting a successful RACH procedure.

Figure 5:
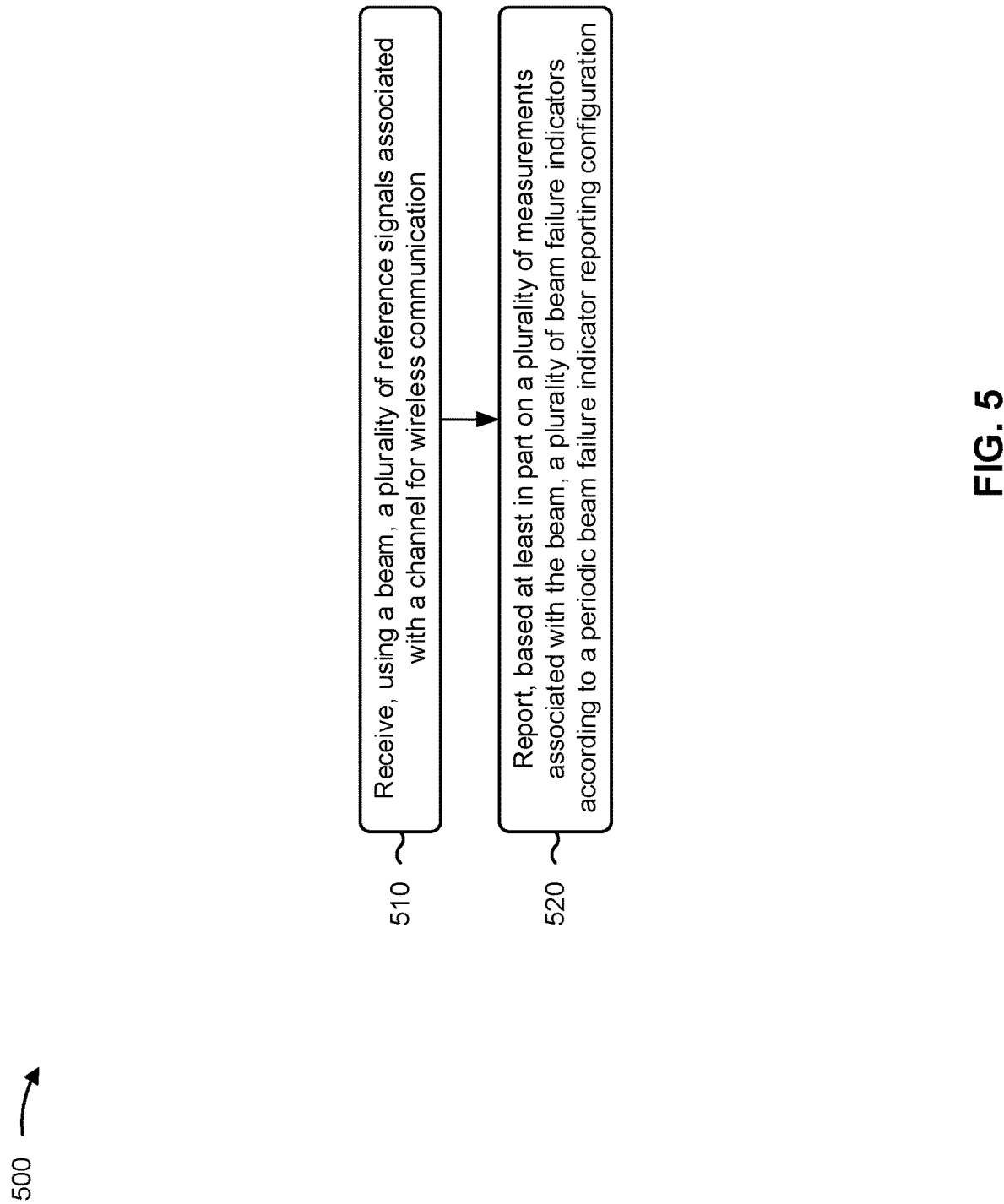
FIGS. 5 and 6 are diagrams illustrating example processes associated with periodic beam failure indicator reporting, in accordance with the present disclosure.

FIG. 5 is a diagram illustrating an example process 500 performed, for example, by a UE, in accordance with the present disclosure. Example process 500 is an example where the UE (e.g., UE 120) performs operations associated with periodic BFI reporting.

As shown in FIG. 5, in some aspects, process 500 may include receiving, using a beam, a plurality of reference signals associated with a channel for wireless communication (block 510). For example, the UE (e.g., using communication manager 140 and/or reception component 702, depicted in FIG. 7) may receive, using a beam, a plurality of reference signals associated with a channel for wireless communication, as described above.

As further shown in FIG. 5, in some aspects, process 500 may include reporting, based at least in part on a plurality of measurements associated with the beam, a plurality of beam failure indicators according to a periodic beam failure indicator reporting configuration (block 520). For example, the UE (e.g., using communication manager 140 and/or transmission component 704, depicted in FIG. 7) may report, based at least in part on a plurality of measurements associated with the beam, a plurality of beam failure indicators according to a periodic beam failure indicator reporting configuration, as described above.

Process 500 may include additional aspects, such as any single aspect or any combination of aspects described below and/or in connection with one or more other processes described elsewhere herein.

In a first aspect, process 500 includes receiving the periodic beam failure indicator reporting configuration.

In a second aspect, alone or in combination with the first aspect, the periodic beam failure indicator reporting configuration indicates at least one reporting frequency.

In a third aspect, alone or in combination with the second aspect, the at least one reporting frequency comprises a plurality of reporting frequencies, the method further comprising selecting an active frequency of the plurality of reporting frequencies.

In a fourth aspect, alone or in combination with the third aspect, process 500 includes receiving an indication of the active frequency.

In a fifth aspect, alone or in combination with one or more of the first through fourth aspects, process 500 includes generating a beam failure report that indicates a count of the plurality of beam failure indicators.

In a sixth aspect, alone or in combination with the fifth aspect, the beam failure report further indicates one or more channel measurements.

In a seventh aspect, alone or in combination with the sixth aspect, the one or more channel measurements correspond to channel state information feedback.

In an eighth aspect, alone or in combination with one or more of the first through seventh aspects, process 500 includes receiving an indication of a beam switching operation based at least in part on the plurality of beam failure indicators.

In a ninth aspect, alone or in combination with one or more of the first through eighth aspects, process 500 includes transmitting a request to enter periodic beam failure indicator reporting status.

In a tenth aspect, alone or in combination with the ninth aspect, transmitting the request comprises transmitting at least one of a medium access control control element or an uplink control information transmission.

In an eleventh aspect, alone or in combination with one or more of the first through tenth aspects, process 500 includes receiving an indication to enter periodic beam failure indicator reporting status.

In a twelfth aspect, alone or in combination with the eleventh aspect, receiving the indication comprises receiving at least one of a medium access control control element or a downlink control information transmission.

In a thirteenth aspect, alone or in combination with one or more of the first through twelfth aspects, process 500 includes detecting an occurrence of a periodic beam failure reporting trigger event, wherein reporting the plurality of beam failure indicators comprises reporting the plurality of beam failure indicators based at least in part on detecting the occurrence of the periodic beam failure reporting trigger event.

In a fourteenth aspect, alone or in combination with the thirteenth aspect, detecting the occurrence of the periodic beam failure reporting trigger event comprises determining that at least one channel measurement satisfies a reporting threshold.

In a fifteenth aspect, alone or in combination with one or more of the first through fourteenth aspects, the periodic beam failure indicator reporting configuration indicates one or more parameter values, the one or more parameter values comprising at least one of a reporting periodicity or a channel condition measurement time period.

In a sixteenth aspect, alone or in combination with the fifteenth aspect, process 500 includes receiving a radio resource control message comprising the periodic beam failure indicator reporting configuration, receiving a dynamic communication comprising a parameter switch indication associated with a first parameter value of the one or more parameter values and a second parameter value of the one or more parameter values, the dynamic communication comprising at least one of a downlink control information transmission or a medium access control control element, and switching from the first parameter value to the second parameter value based at least in part on the parameter switch indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
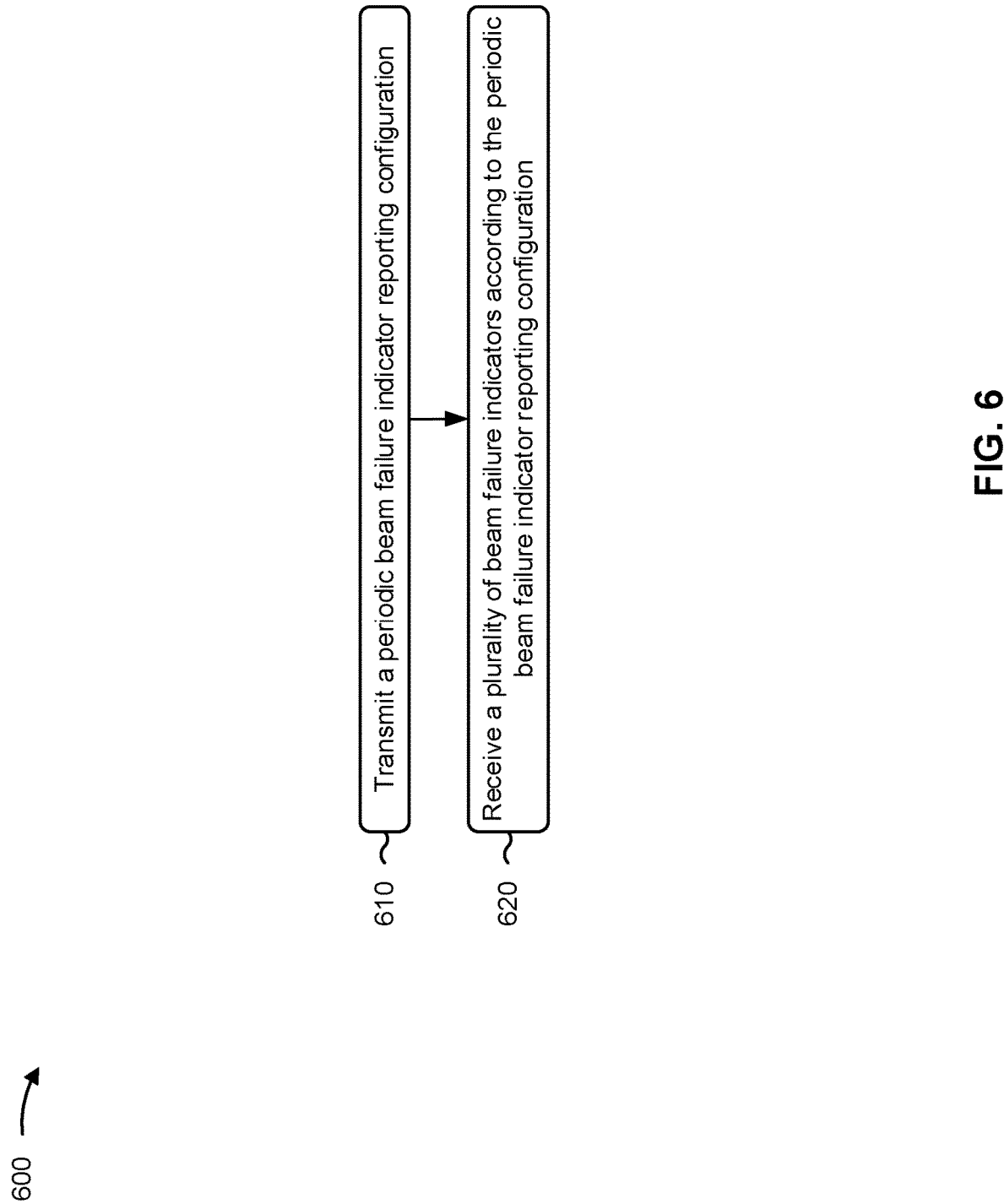

FIG. 6 is a diagram illustrating an example process 600 performed, for example, by a base station, in accordance with the present disclosure. Example process 600 is an example where the base station (e.g., base station 110) performs operations associated with periodic beam failure indicator reporting.

As shown in FIG. 6, in some aspects, process 600 may include transmitting a periodic beam failure indicator reporting configuration (block 610). For example, the base station (e.g., using communication manager 150 and/or transmission component 804, depicted in FIG. 8) may transmit a periodic beam failure indicator reporting configuration, as described above.

As further shown in FIG. 6, in some aspects, process 600 may include receiving a plurality of beam failure indicators according to the periodic beam failure indicator reporting configuration (block 620). For example, the base station (e.g., using communication manager 150 and/or reception component 802, depicted in FIG. 8) may receive a plurality of beam failure indicators according to the periodic beam failure indicator reporting configuration, as described above.

Process 600 may include additional aspects, such as any single aspect or any combination of aspects described below and/or in connection with one or more other processes described elsewhere herein.

In a first aspect, the periodic beam failure indicator reporting configuration indicates at least one reporting frequency.

In a second aspect, alone or in combination with the first aspect, the at least one reporting frequency comprises a plurality of reporting frequencies, the method further comprising transmitting an indication of an active frequency of the plurality of reporting frequencies.

In a third aspect, alone or in combination with one or more of the first and second aspects, process 600 includes receiving a beam failure report that indicates a count of the plurality of beam failure indicators.

In a fourth aspect, alone or in combination with the third aspect, the beam failure report further indicates one or more channel measurements.

In a fifth aspect, alone or in combination with one or more of the first through fourth aspects, process 600 includes transmitting an indication of a beam switching operation based at least in part on the plurality of beam failure indicators.

In a sixth aspect, alone or in combination with one or more of the first through fifth aspects, process 600 includes receiving a request to enter periodic beam failure indicator reporting status.

In a seventh aspect, alone or in combination with one or more of the first through sixth aspects, process 600 includes transmitting an indication to enter periodic beam failure indicator reporting status.

In an eighth aspect, alone or in combination with the seventh aspect, transmitting the indication comprises transmitting at least one of a medium access control control element or a downlink control information transmission.

In a ninth aspect, alone or in combination with one or more of the first through eighth aspects, the periodic beam failure indicator reporting configuration indicates one or more parameter values, the one or more parameter values comprising at least one of a reporting periodicity or a channel condition measurement time period.

In a tenth aspect, alone or in combination with the ninth aspect, process 600 includes transmitting a dynamic communication comprising a parameter switch indication associated with a first parameter value of the one or more parameter values and a second parameter value of the one or more parameter values, the dynamic communication comprising at least one of a downlink control information transmission or a medium access control control element.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
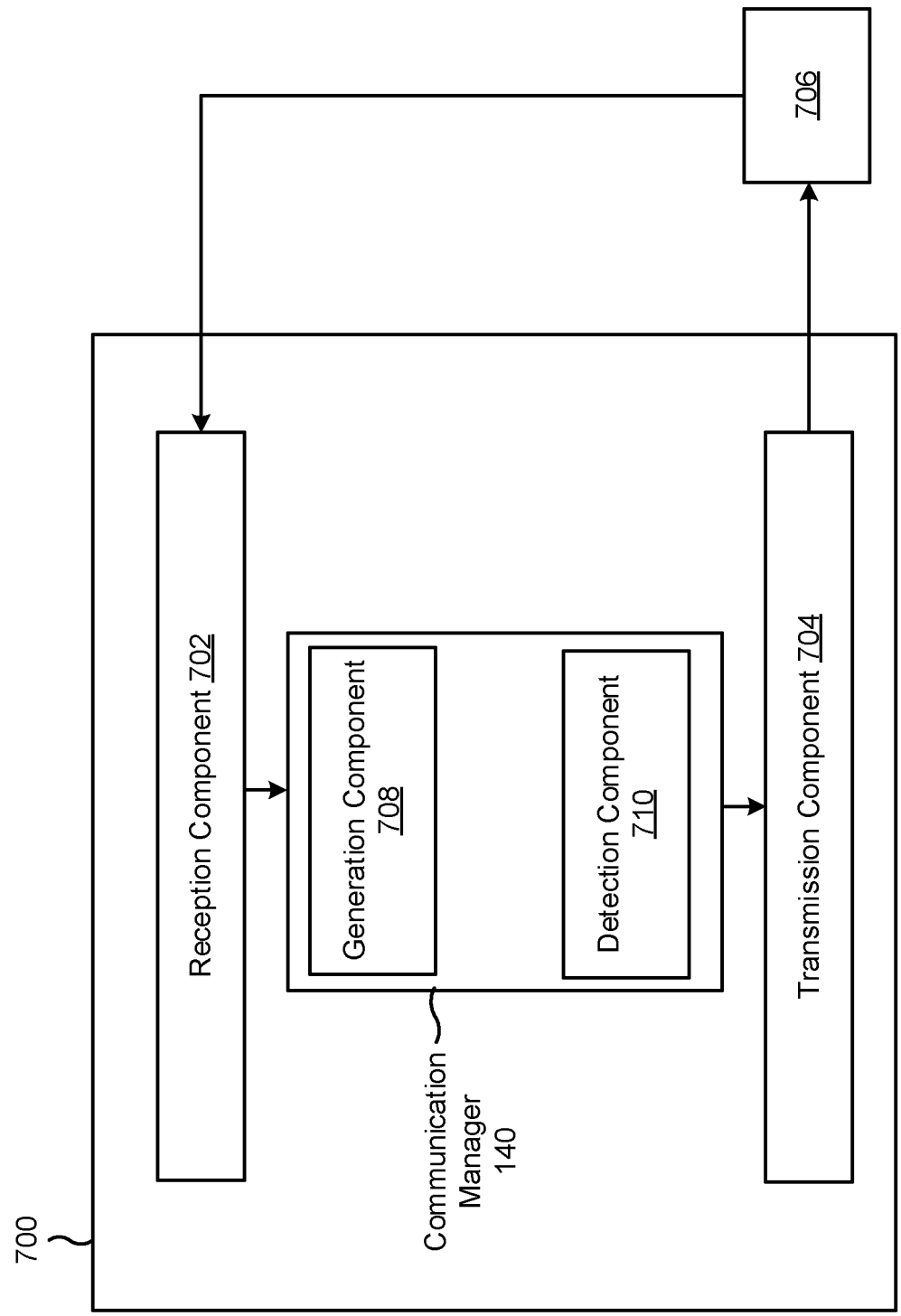
FIGS. 7 and 8 are block diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a generation component 708 or a detection component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, using a beam, a plurality of reference signals associated with a channel for wireless communication. The transmission component 704 may report, based at least in part on a plurality of measurements associated with the beam, a plurality of beam failure indicators according to a periodic beam failure indicator reporting configuration.

The reception component 702 may receive the periodic beam failure indicator reporting configuration. The reception component 702 may receive an indication of the active frequency.

The generation component 708 may generate a beam failure report that indicates a count of the plurality of beam failure indicators. In some aspects, the generation component 708 may include one or more antennas, a modem, a modulator, a transmit MIMO processor, a transmit processor, a controller/processor, a memory, or a combination thereof, of the UE described in connection with FIG. 2.

The reception component 702 may receive an indication of a beam switching operation based at least in part on the plurality of beam failure indicators.

The transmission component 704 may transmit a request to enter periodic beam failure indicator reporting status. The reception component 702 may receive an indication to enter periodic beam failure indicator reporting status.

The detection component 710 may detect an occurrence of a periodic beam failure reporting trigger event, wherein reporting the plurality of beam failure indicators comprises reporting the plurality of beam failure indicators based at least in part on detecting the occurrence of the periodic beam failure reporting trigger event. In some aspects, the detection component 710 may include one or more antennas, a modem, a modulator, a transmit MIMO processor, a transmit processor, a controller/processor, a memory, or a combination thereof, of the UE described in connection with FIG. 2.

The reception component 702 may receive a radio resource control message comprising the periodic beam failure indicator reporting configuration. The reception component 702 may receive a dynamic communication comprising a parameter switch indication associated with a first parameter value of the one or more parameter values and a second parameter value of the one or more parameter values, the dynamic communication comprising at least one of a downlink control information transmission or a medium access control control element.

The communication manager 140 may switch from the first parameter value to the second parameter value based at least in part on the parameter switch indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
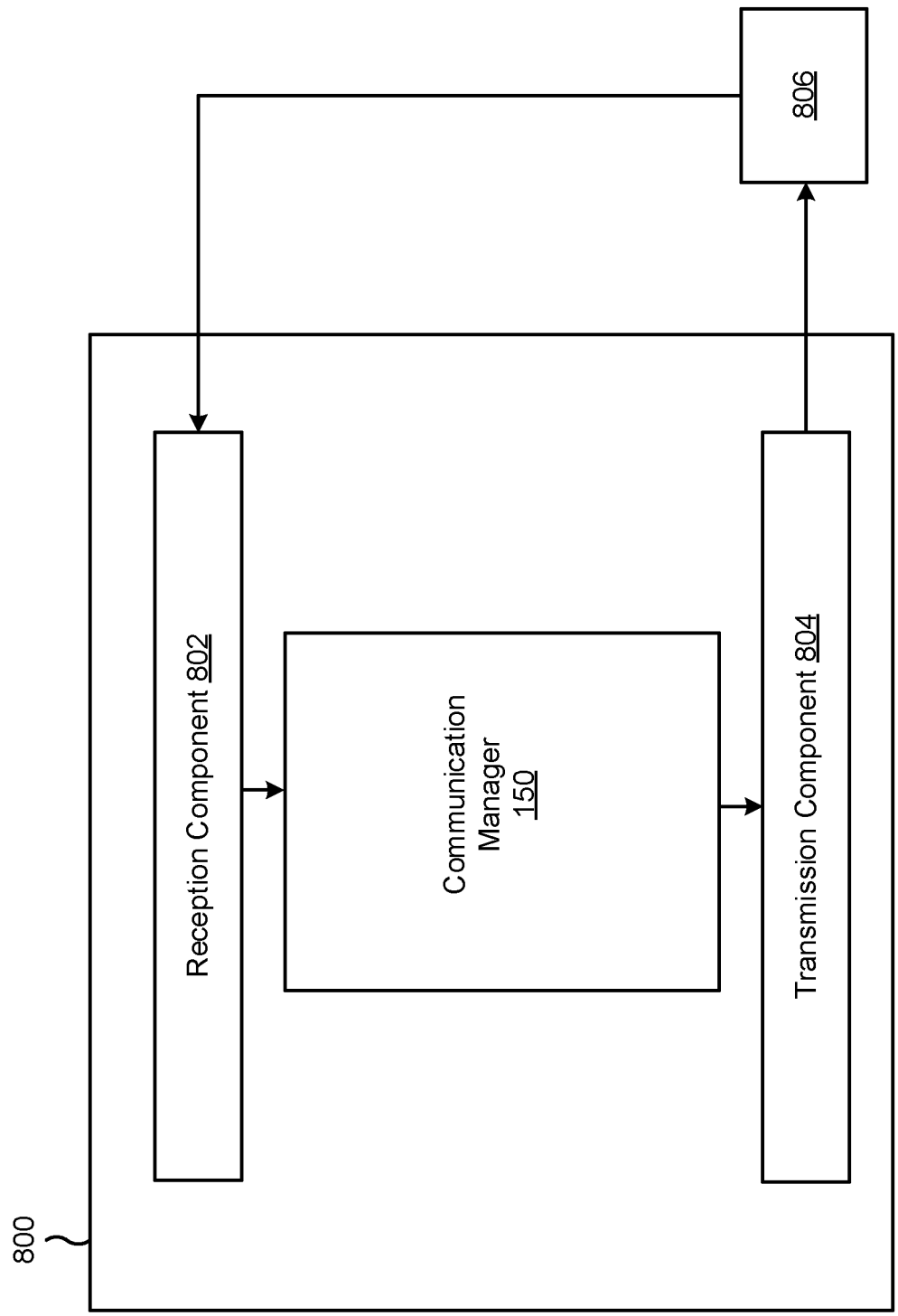

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may manage any number of aspects of operation of the reception component and/or the transmission component 804.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a periodic beam failure indicator reporting configuration. The reception component 802 may receive a plurality of beam failure indicators according to the periodic beam failure indicator reporting configuration.

The reception component 802 may receive a beam failure report that indicates a count of the plurality of beam failure indicators.

The transmission component 804 may transmit an indication of a beam switching operation based at least in part on the plurality of beam failure indicators.

The reception component 802 may receive a request to enter periodic beam failure indicator reporting status. The transmission component 804 may transmit an indication to enter periodic beam failure indicator reporting status.

The transmission component 804 may transmit a dynamic communication comprising a parameter switch indication associated with a first parameter value of the one or more parameter values and a second parameter value of the one or more parameter values, the dynamic communication comprising at least one of a downlink control information transmission or a medium access control control element.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, using a beam, a plurality of reference signals associated with a channel for wireless communication; and reporting, based at least in part on a plurality of measurements associated with the beam, a plurality of beam failure indicators according to a periodic beam failure indicator reporting configuration.

Aspect 2: The method of Aspect 1, further comprising receiving the periodic beam failure indicator reporting configuration.

Aspect 3: The method of Aspect 2, wherein the periodic beam failure indicator reporting configuration indicates at least one reporting frequency.

Aspect 4: The method of Aspect 3, wherein the at least one reporting frequency comprises a plurality of reporting frequencies, the method further comprising selecting an active frequency of the plurality of reporting frequencies.

Aspect 5: The method of Aspect 4, further comprising receiving an indication of the active frequency.

Aspect 6: The method of any of Aspects 1-5, further comprising generating a beam failure report that indicates a count of the plurality of beam failure indicators.

Aspect 7: The method of Aspect 6, wherein the beam failure report further indicates one or more channel measurements.

Aspect 8: The method of Aspect 7, wherein the one or more channel measurements correspond to channel state information feedback.

Aspect 9: The method of any of Aspects 1-8, further comprising receiving an indication of a beam switching operation based at least in part on the plurality of beam failure indicators.

Aspect 10: The method of any of Aspects 1-9, further comprising transmitting a request to enter periodic beam failure indicator reporting status.

Aspect 11: The method of Aspect 10, wherein transmitting the request comprises transmitting at least one of a medium access control control element or an uplink control information transmission.

Aspect 12: The method of any of Aspects 1-11, further comprising receiving an indication to enter periodic beam failure indicator reporting status.

Aspect 13: The method of Aspect 12, wherein receiving the indication comprises receiving at least one of a medium access control control element or a downlink control information transmission.

Aspect 14: The method of any of Aspects 1-13, further comprising detecting an occurrence of a periodic beam failure reporting trigger event, wherein reporting the plurality of beam failure indicators comprises reporting the plurality of beam failure indicators based at least in part on detecting the occurrence of the periodic beam failure reporting trigger event.

Aspect 15: The method of Aspect 14, wherein detecting the occurrence of the periodic beam failure reporting trigger event comprises determining that at least one channel measurement satisfies a reporting threshold.

Aspect 16: The method of any of Aspects 1-13, wherein the periodic beam failure indicator reporting configuration indicates one or more parameter values, the one or more parameter values comprising at least one of a reporting periodicity or a channel condition measurement time period.

Aspect 17: The method of Aspect 16, further comprising: receiving a radio resource control message comprising the periodic beam failure indicator reporting configuration; receiving a dynamic communication comprising a parameter switch indication associated with a first parameter value of the one or more parameter values and a second parameter value of the one or more parameter values, the dynamic communication comprising at least one of a downlink control information transmission or a medium access control control element; and switching from the first parameter value to the second parameter value based at least in part on the parameter switch indication.

Aspect 18: A method of wireless communication performed by a base station, comprising: transmitting a periodic beam failure indicator reporting configuration; and receiving a plurality of beam failure indicators according to the periodic beam failure indicator reporting configuration.

Aspect 19: The method of Aspect 18, wherein the periodic beam failure indicator reporting configuration indicates at least one reporting frequency.

Aspect 20: The method of Aspect 19, wherein the at least one reporting frequency comprises a plurality of reporting frequencies, the method further comprising transmitting an indication of an active frequency of the plurality of reporting frequencies.

Aspect 21: The method of any of Aspects 18-20, further comprising receiving a beam failure report that indicates a count of the plurality of beam failure indicators.

Aspect 22: The method of Aspect 21, wherein the beam failure report further indicates one or more channel measurements.

Aspect 23: The method of any of Aspects 18-22, further comprising transmitting an indication of a beam switching operation based at least in part on the plurality of beam failure indicators.

Aspect 24: The method of any of Aspects 18-23, further comprising receiving a request to enter periodic beam failure indicator reporting status.

Aspect 25: The method of any of Aspects 18-24, further comprising transmitting an indication to enter periodic beam failure indicator reporting status.

Aspect 26: The method of Aspect 25, wherein transmitting the indication comprises transmitting at least one of a medium access control control element or a downlink control information transmission.

Aspect 27: The method of any of Aspects 18-26, wherein the periodic beam failure indicator reporting configuration indicates one or more parameter values, the one or more parameter values comprising at least one of a reporting periodicity or a channel condition measurement time period.

Aspect 28: The method of Aspect 27, further comprising transmitting a dynamic communication comprising a parameter switch indication associated with a first parameter value of the one or more parameter values and a second parameter value of the one or more parameter values, the dynamic communication comprising at least one of a downlink control information transmission or a medium access control control element.

Aspect 29: An apparatus for wireless communication at a device, comprising a processor; memory coupled with the processor; and instructions stored in the memory and executable by the processor to cause the apparatus to perform the method of one or more of Aspects 1-17.

Aspect 30: A device for wireless communication, comprising a memory and one or more processors coupled to the memory, the one or more processors configured to perform the method of one or more of Aspects 1-17.

Aspect 31: An apparatus for wireless communication, comprising at least one means for performing the method of one or more of Aspects 1-17.

Aspect 32: A non-transitory computer-readable medium storing code for wireless communication, the code comprising instructions executable by a processor to perform the method of one or more of Aspects 1-17.

Aspect 33: A non-transitory computer-readable medium storing a set of instructions for wireless communication, the set of instructions comprising one or more instructions that, when executed by one or more processors of a device, cause the device to perform the method of one or more of Aspects 1-17.

Aspect 34: An apparatus for wireless communication at a device, comprising a processor; memory coupled with the processor; and instructions stored in the memory and executable by the processor to cause the apparatus to perform the method of one or more of Aspects 18-28.

Aspect 35: A device for wireless communication, comprising a memory and one or more processors coupled to the memory, the one or more processors configured to perform the method of one or more of Aspects 18-28.

Aspect 36: An apparatus for wireless communication, comprising at least one means for performing the method of one or more of Aspects 18-28.

Aspect 37: A non-transitory computer-readable medium storing code for wireless communication, the code comprising instructions executable by a processor to perform the method of one or more of Aspects 18-28.

Aspect 38: A non-transitory computer-readable medium storing a set of instructions for wireless communication, the set of instructions comprising one or more instructions that, when executed by one or more processors of a device, cause the device to perform the method of one or more of Aspects 18-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories storing processor-executable code; and
one or more processors coupled with the one or more memories, at least one processor of the one or more processors configured to cause the UE to:
receive, from a base station using a beam, a plurality of reference signals associated with a channel for wireless communication; and
report, to the base station in accordance with a plurality of measurements associated with the beam, a count of a plurality of beam failure indicators according to a periodic beam failure indicator reporting configuration.

2. The apparatus of claim 1, wherein at least one processor of the one or more processors is configured to cause the UE to receive the periodic beam failure indicator reporting configuration.

3. The apparatus of claim 2, wherein the periodic beam failure indicator reporting configuration indicates at least one reporting frequency.

4. The apparatus of claim 3, wherein the at least one reporting frequency comprises a plurality of reporting frequencies, and wherein at least one processor of the one or more processors is configured to cause the UE to select an active frequency of the plurality of reporting frequencies.

5. The apparatus of claim 4, wherein at least one processor of the one or more processors is configured to cause the UE to receive an indication of the active frequency.

6. The apparatus of claim 1, wherein at least one processor of the one or more processors is configured to cause the UE to generate a beam failure report that indicates the count of the plurality of beam failure indicators.

7. The apparatus of claim 6, wherein the beam failure report further indicates one or more channel measurements.

8. The apparatus of claim 7, wherein the one or more channel measurements correspond to channel state information feedback.

9. The apparatus of claim 1, wherein at least one processor of the one or more processors is configured to cause the UE to receive an indication of a beam switching operation responsive to the count of the plurality of beam failure indicators.

10. The apparatus of claim 1, wherein at least one processor of the one or more processors is configured to cause the UE to transmit a request to enter periodic beam failure indicator reporting status.

11. The apparatus of claim 10, wherein at least one processor of the one or more processors, to transmit the request, is configured to cause the UE to transmit at least one of a medium access control control element or an uplink control information transmission.

12. The apparatus of claim 1, wherein at least one processor of the one or more processors is configured to cause the UE to receive an indication to enter periodic beam failure indicator reporting status.

13. The apparatus of claim 12, wherein at least one processor of the one or more processors, to receive the indication, is configured to cause the UE to receive at least one of a medium access control control element or a downlink control information transmission.

14. The apparatus of claim 1, wherein at least one processor of the one or more processors is configured to cause the UE to detect an occurrence of a periodic beam failure reporting trigger event, and wherein, to report the count of the plurality of beam failure indicators, at least one processor of the one or more processors is configured to cause the UE to report the count of the plurality of beam failure indicators responsive to detection of the occurrence of the periodic beam failure reporting trigger event.

15. The apparatus of claim 14, wherein at least one processor of the one or more processors, to detect the occurrence of the periodic beam failure reporting trigger event, is configured to cause the UE to determine that at least one channel measurement satisfies a reporting threshold.

16. The apparatus of claim 1, wherein the periodic beam failure indicator reporting configuration indicates one or more parameter values, the one or more parameter values comprising at least one of a reporting periodicity or a channel condition measurement time period.

17. The apparatus of claim 16, wherein at least one processor of the one or more processors is configured to cause the UE to:
receive a radio resource control message comprising the periodic beam failure indicator reporting configuration;
receive a dynamic communication comprising a parameter switch indication associated with a first parameter value of the one or more parameter values and a second parameter value of the one or more parameter values, the dynamic communication comprising at least one of a downlink control information transmission or a medium access control control element; and
switch from the first parameter value to the second parameter value based at least in part on the parameter switch indication.

18. An apparatus for wireless communication at a base station, comprising:
one or more memories storing processor-executable code; and
one or more processors coupled with the one or more memories, at least one processor of the one or more processors configured to cause the base station to:
transmit, to a user equipment (UE), a periodic beam failure indicator reporting configuration; and
receive, from the UE, a count of a plurality of beam failure indicators according to the periodic beam failure indicator reporting configuration.

19. The apparatus of claim 18, wherein the periodic beam failure indicator reporting configuration indicates at least one reporting frequency.

20. The apparatus of claim 19, wherein the at least one reporting frequency comprises a plurality of reporting frequencies, and wherein at least one processor of the one or more processors is configured to cause the base station to transmit an indication of an active frequency of the plurality of reporting frequencies.

21. The apparatus of claim 20, wherein at least one processor of the one or more processors is configured to cause the base station to receive a beam failure report that indicates a count of the plurality of beam failure indicators.

22. The apparatus of claim 21, wherein the beam failure report further indicates one or more channel measurements.

23. The apparatus of claim 18, wherein at least one processor of the one or more processors is configured to cause the base station to transmit an indication of a beam switching operation based at least in part on the plurality of beam failure indicators.

24. The apparatus of claim 18, wherein at least one processor of the one or more processors is configured to cause the base station to receive a request to enter periodic beam failure indicator reporting status.

25. The apparatus of claim 18, wherein at least one processor of the one or more processors is configured to cause the base station to transmit an indication to enter periodic beam failure indicator reporting status.

26. The apparatus of claim 25, wherein at least one processor of the one or more processors, to transmit the indication, is configured to cause the base station to transmit at least one of a medium access control control element or a downlink control information transmission.

27. The apparatus of claim 18, wherein the periodic beam failure indicator reporting configuration indicates one or more parameter values, the one or more parameter values comprising at least one of a reporting periodicity or a channel condition measurement time period.

28. The apparatus of claim 27, wherein at least one processor of the one or more processors is configured to cause the base station to transmit a dynamic communication comprising a parameter switch indication associated with a first parameter value of the one or more parameter values and a second parameter value of the one or more parameter values, the dynamic communication comprising at least one of a downlink control information transmission or a medium access control control element.

29. A method of wireless communication performed at a user equipment (UE), comprising:
  receiving, from a base station using a beam, a plurality of reference signals associated with a channel for wireless communication; and
  reporting, to the base station in accordance with a plurality of measurements associated with the beam, a count of a plurality of beam failure indicators according to a periodic beam failure indicator reporting configuration.

30. A method of wireless communication performed at a base station, comprising:
  transmitting, to a user equipment (UE), a periodic beam failure indicator reporting configuration; and
  receiving, from the UE, a count of a plurality of beam failure indicators according to the periodic beam failure indicator reporting configuration.

\* \* \* \* \*